United States Patent
Yokomori et al.

(10) Patent No.: US 6,684,041 B2
(45) Date of Patent: Jan. 27, 2004

(54) PROCESS CARTRIDGE, ELECTROPHOTOGRAPHIC PHOTOSENSITIVE DRUM, ELECTROPHOTOGRAPHIC IMAGE FORMING APPARATUS AND COLOR ELECTROPHOTOGRAPHIC IMAGE FORMING APPARATUS

(75) Inventors: Kanji Yokomori, Odawara (JP); Takeshi Arimitsu, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/058,408

(22) Filed: Jan. 30, 2002

(65) Prior Publication Data

US 2002/0110388 A1 Aug. 15, 2002

(30) Foreign Application Priority Data

Feb. 2, 2001 (JP) ........................... 2001/026734
Jan. 11, 2002 (JP) ........................... 2002/004087

(51) Int. Cl.$^7$ ............................................. G03G 15/00
(52) U.S. Cl. ........................ 399/167; 399/117
(58) Field of Search ..................... 399/88, 111, 116, 399/117, 159, 167; 464/160, 162, 901

(56) References Cited

U.S. PATENT DOCUMENTS

| | | | |
|---|---|---|---|
| 5,839,028 A | 11/1998 | Nomura et al. ............. 399/109 |
| 5,878,309 A | 3/1999 | Nomura et al. ............. 399/111 |
| 5,903,803 A | * 5/1999 | Kawai et al. ............... 399/116 |
| 5,940,657 A | 8/1999 | Yokomori et al. .......... 399/119 |
| 5,943,528 A | 8/1999 | Akutsu et al. .............. 399/110 |
| 5,946,531 A | 8/1999 | Miura et al. ................ 399/111 |
| 5,950,049 A | 9/1999 | Yokomori et al. .......... 399/119 |
| 5,953,562 A | 9/1999 | Kawaguchi et al. ........ 399/117 |
| 6,002,896 A | 12/1999 | Miyamoto et al. .......... 399/114 |
| 6,029,031 A | 2/2000 | Yokomori et al. .......... 399/109 |
| 6,055,406 A | 4/2000 | Kawai et al. ............... 399/360 |
| 6,061,538 A | 5/2000 | Arimitsu et al. ............ 399/111 |
| 6,064,843 A | 5/2000 | Isobe et al. ................. 399/111 |

(List continued on next page.)

FOREIGN PATENT DOCUMENTS

| | | |
|---|---|---|
| JP | 63-84144 | 6/1988 |
| JP | 11-95639 | 4/1999 |
| JP | 2001-134029 | * 5/2001 |

OTHER PUBLICATIONS

U.S. patent application Ser. No. 09/752,675, Arimitsu et al., filed Jan. 3, 2001.

U.S. patent application Ser. No. 09/760,702, Nittani et al., filed Jan. 17, 2001.

Primary Examiner—Sophia S. Chen
(74) Attorney, Agent, or Firm—Fitzpatrick, Cella, Harper & Scinto

(57) ABSTRACT

A process cartridge is detachably mountable to a main assembly of an electrophotographic image forming apparatus for forming an image on a recording material, the apparatus including a motor, a driving rotatable member for transmitting a driving force from the motor, and a twisted recess being rotatable integrally with the driving rotatable member. The process cartridge includes an electrophotographic photosensitive drum, a process device actable on the drum, a twisted projection being engageable with the recess, and a permitting portion for permitting engagement between the twisted protection and the recess only at a predetermined relative rotational position therebetween to establish the engagement therebetween with the predetermined relative to rotational position. When the process cartridge is mounted to the main assembly of the apparatus, the rotating force is transmitted from the driving rotatable member to the drum by rotation of the driving rotatable member with the twisted projection being in engagement with the recess.

20 Claims, 13 Drawing Sheets

U.S. PATENT DOCUMENTS

| | | | |
|---|---|---|---|
| 6,072,969 A | 6/2000 | Yokomori et al. | 399/119 |
| 6,175,706 B1 * | 1/2001 | Watanabe et al. | 399/167 |
| 6,215,969 B1 | 4/2001 | Nomura et al. | 399/111 |
| 6,282,390 B1 | 8/2001 | Miyabe et al. | 399/111 |
| 6,336,018 B1 * | 1/2002 | Kawai et al. | 399/117 |
| 6,345,164 B1 | 2/2002 | Yokomori et al. | 399/119 |
| 6,351,620 B1 | 2/2002 | Miyabe et al. | 399/111 |
| 6,381,430 B1 | 4/2002 | Yokomori et al. | 399/119 |

* cited by examiner

PROCESS CARTRIDGE, ELECTROPHOTOGRAPHIC PHOTOSENSITIVE DRUM, ELECTROPHOTOGRAPHIC IMAGE FORMING APPARATUS AND COLOR ELECTROPHOTOGRAPHIC IMAGE FORMING APPARATUS

FIELD OF THE INVENTION AND RELATED ART

The present invention relates to an electrophotographic image forming apparatus, a color electrophotographic image forming apparatus, a process cartridge process cartridge detachably mountable to such an electrophotographic image forming apparatus, and an electrophotographic photosensitive drum. Here, the electrophotographic image forming apparatus is an apparatus which forms an image on a recording material through an electrophotographic process. The electrophotographic image forming apparatus may be an electrophotographic copying machine, an electrophotographic printer (a LED printer, a laser beam printer or the like), an electrophotographic printer type facsimile machine, an electrophotographic printer type word processor or the like.

The process cartridge is a cartridge containing as a unit an electrophotographic photosensitive drum and process means such as a charge member, a developing member or a cleaning member, the unit being detachably mountable to the main assembly of the image forming apparatus. The process cartridge is a cartridge containing as a unit an electrophotographic photosensitive drum and at least one of process means such as a charge member, a developing member and a cleaning member, the unit being detachably mountable to the main assembly of the image forming apparatus. The process cartridge may contain as a unit an electrophotographic photosensitive drum and at least a developing member, the unit being detachably mountable to a main assembly of the electrophotographic image forming apparatus.

In an electrophotographic image forming apparatus using the electrophotographic image forming process, use has been made with the process cartridge type in which the process cartridge comprises as a unit the electrophotographic photosensitive member and process means actable on the electrophotographic photosensitive member, the unit being detachably mountable to the main assembly of the electrophotographic image forming apparatus. With the use of the process cartridge type, the maintenance operation can be carried out in effect by the users without necessity of relying on serviceman, and therefore, the operativity is improved. Therefore, the process cartridge type is widely used in the field of electrophotographic image forming apparatus. Such a process cartridge is provided at a longitudinal end of the photosensitive drum with a driving force receiving portion. When the process cartridge is mounted to the main assembly of the apparatus, the driving force receiving portion is brought into engagement with a driving force transmitting portion provided in the main assembly of the apparatus. By doing so, the photosensitive drum can receive the rotational driving force from the main assembly of apparatus, and therefore, is rotatable. In the case of a color electrophotographic image forming apparatus, a plurality of process cartridges containing different color developers are mounted. For example, in the case of a full color electrophotographic image forming apparatus, four process cartridges containing a black color developer, a yellow color developer, a magenta color developer and a cyan color developer, respectively. When a plurality of process cartridges are mounted, the following problems may arise.

Referring to FIG. 14, the positional deviation of the process cartridge results in the deviations of the image formation positions in the form of a sunisoidal wave on the recording material (paper, textile or the like).

In FIG. 14, the abscissa represents a distance from a leading end of the image, and the ordinate represents the positional deviation from the correct image formation position.

The causes may be (1) an axis of the drum driving gear provided in the main assembly of image forming apparatus is inclined relative to the gear of the motor, by which the image formation position periodically varies at the regular intervals of the drum driving gear rotation, that is, in the period of rotation of the photosensitive drum: (2) by a non-uniform rotation of the photosensitive drum, the positioned periodically varies at the intervals of the circumferential length of the photosensitive drum.

In order to adjust the phase relation due to the positional deviations among the four color images, as shown in FIG. 14, the image formation start timing for each color is controlled. More particularly, the image formation is carried out for each color, and the image formation positions are detected.

As shown in FIG. 14, when the Bk (black) color is taken as a reference, the Y color (yellow) color is deviated toward the leading end of the image by a distance distance y, by which the relative color misregistration from the Bk color image can be reduced. Similarly, the M (magenta) color image is deviated by a distance m, C (cyan) color image is dictated by a distance c. By such a phase control, the color misregistration can be reduced. However, the phase detection and the control require a certain length of time. Therefore, if these operations are carried out frequently, the image formation time becomes longer. For example, in them describe the structure, the meshing engagement relation between the photosensitive drum and drum driving gear, that is the phase relationship may change in the rotational direction. Therefore, the phase detection and the phase control have to be carried out for each mounting-and-demounting of the process cartridge.

SUMMARY OF THE INVENTION

The present invention is directed to a solution to the problem.

Accordingly, it is a principal object of the present invention to provide a process cartridge, an electrophotographic image forming apparatus to which the process cartridge is detachably mountable in which the rotational accuracy of the electrophotographic photosensitive drum is improved.

It is another object of the present invention to provide a process cartridge and an electrophotographic image forming apparatus to which a process cartridge is detachably mountable, in which the engagement position with respect to the rotational direction is made constant when the driving force receiving portion of the process cartridge is brought into engagement with the driving force transmitting portion provided in the main assembly of the image forming apparatus.

It is a further object of the present invention to provide a process cartridge and an electrophotographic image forming apparatus to which the process cartridge is detachably mountable, in which when the driving force receiving portion of the process cartridge is brought into engagement with the driving force transmitting portion provided in the main assembly of image forming apparatus, the engagement is accomplished at a predetermined position.

It is a further object of the present invention to provide a process cartridge and a color electrophotographic image forming apparatus to which the process cartridge is detachably mountable in which the color misregistration can be suppressed when a color (full-color) image is formed.

It is a further object of the present invention to provide a process cartridge and an electrophotographic image forming apparatus to which the process cartridge is detachably mountable in which the phase detection and phase control operations are not required each time the mounting-and-demounting of the process cartridge.

It is a further object of the present invention to provide a process cartridge and an electrophotographic image forming apparatus to which the process cartridge is detachably mountable in which there is provided a permitting portion for permitting engagement at a predetermined position in order to make the engaging position constant when a twisted projection and a twisted recess are engaged with each other.

It is a further object of the present invention to provide a process cartridge and an electrophotographic image forming apparatus to which the process cartridge is detachably mountable, wherein the positional accuracy and the rotational accuracy of the electrophotographic photosensitive drum is improved with a simple driving structure for the electrophotographic photosensitive drum.

It is a further object of the present invention to provide an electrophotographic photosensitive drum suitable for accomplishing the above-described respective objects.

The electrophotographic image forming apparatus may be a monochromatic and color (full-color) electrophotographic image forming apparatus.

The present invention is particularly effective when it is used with a color (full-color) electrophotographic image forming apparatus and a process cartridge for a color (full-color) electrophotographic image forming apparatus.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS (General Arrangement of a Color (Full-color) Electrophotographic Image Forming Apparatus)

The description will be made as to a color electrophotographic image forming apparatus as an exemplary electrophotographic image forming apparatus according to an embodiment of the present invention.

Figure 1:
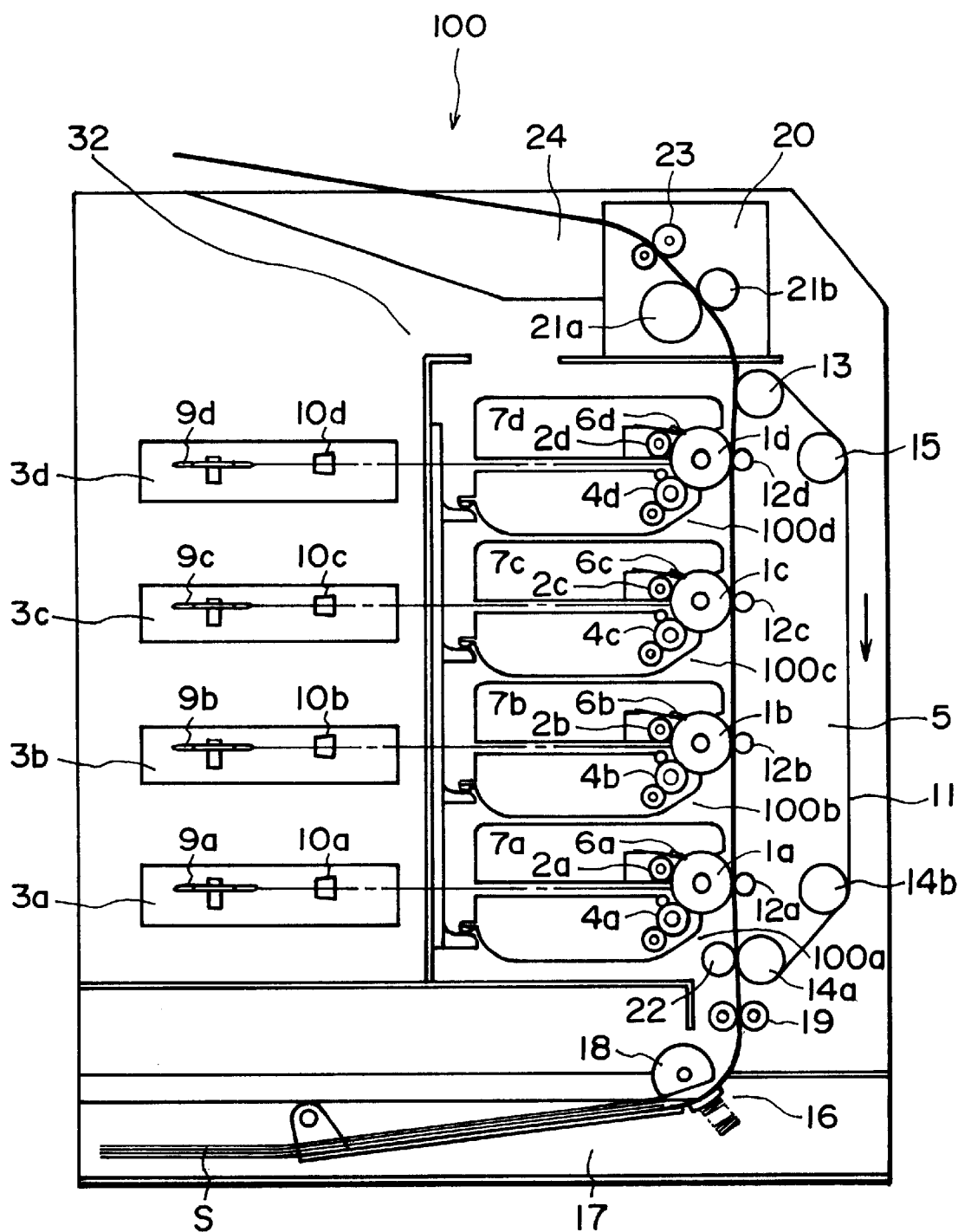
FIG. 1 is a longitudinal sectional view of an entirety of an image forming apparatus according to an embodiment of the present invention.

Referring to FIG. 1, the general arrangement of the color (full-color) electrophotographic image forming apparatus will be described. FIG. 1 is a longitudinal sectional view illustrating a general arrangement of a full-color laser beam printer which is an example of the color (full-color) electrophotographic image forming apparatus. A main assembly of the color (full-color) electrophotographic image forming apparatus (main assembly of the full-color laser beam printer) is provided with four mounting portions 100 (100a–100d) which are juxtaposed and arranged in the vertical direction. To the mounting portions 100, process cartridges 7 (7a–7d) are detachably mounted, respectively. An electrophotographic photosensitive drum (photosensitive drum) provided in the process cartridge 7 is rotated in the counterclockwise direction by a motor (unshown). Around the photosensitive drum 1, there are provided a charging device 2 (2a, 2b, 2c, 2d) for uniformly charging a surface of the photosensitive drum 1, a developing device 4 (4a, 4b, 4c, 4d) for developing an electrostatic latent image formed on the photosensitive drum 1, an electrostatic transferring device 5 for transferring the developed image from the photosensitive drum 1 onto the recording material S, a cleaning device 6 (6a, 6b, 6c, 6d) for removing the residual developer from the surface of the photosensitive drum 1 after the image transfer, in the order named.

As described in the foregoing, the process cartridge in this embodiment comprises as a unit the photosensitive drum 1, the charging device 2, the developing device 4 and the cleaning device 6, in the form of a process cartridge. Therefore, there are four process cartridges 7 (7a, 7b. 7c. 7d). The main assembly 100 of the image information comprises a scanner unit 3 (3a, 3b, 3c, 3d) for projecting a laser beam onto the photosensitive drum 1 after the photosensitive drum 1 is electrically charged. By the protection of the laser beam, an electrostatic latent image is formed on the photosensitive drum 1. The description will be made as to the elements, from the photosensitive drum 1.

The photosensitive drum 1 comprises an aluminum cylinder having a diameter of 30 mm, and an organic photoconductive layer (OPC photosensitive member) on the outer surface thereof. The photosensitive drum 1 is rotatably supported by a supporting member at each of the opposite longitudinal ends. At one of the longitudinal ends, the photosensitive drum 1 receives a driving force from a motor (unshown). By this, the photosensitive drum 1 is rotated in the counterclockwise direction.

Figure 12:
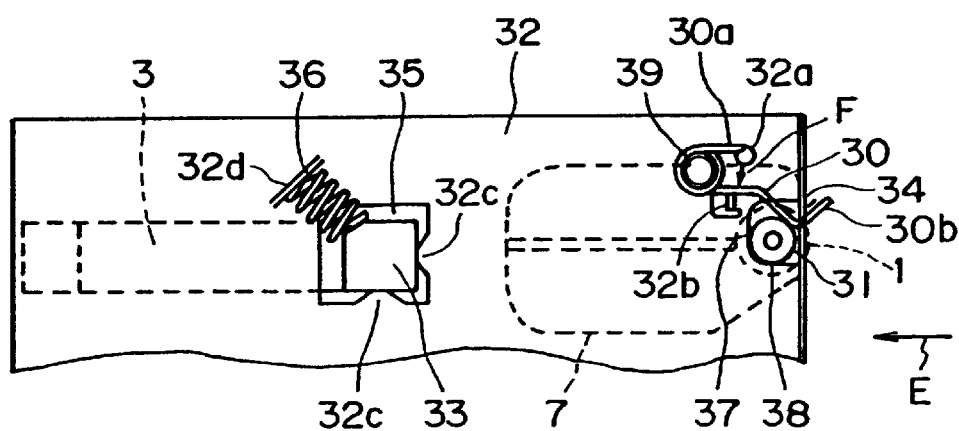
FIG. 12 is a side view illustrating mounting-and-demounting of the process cartridge relative to the main assembly of apparatus according to an embodiment of the present invention.
Figure 13:
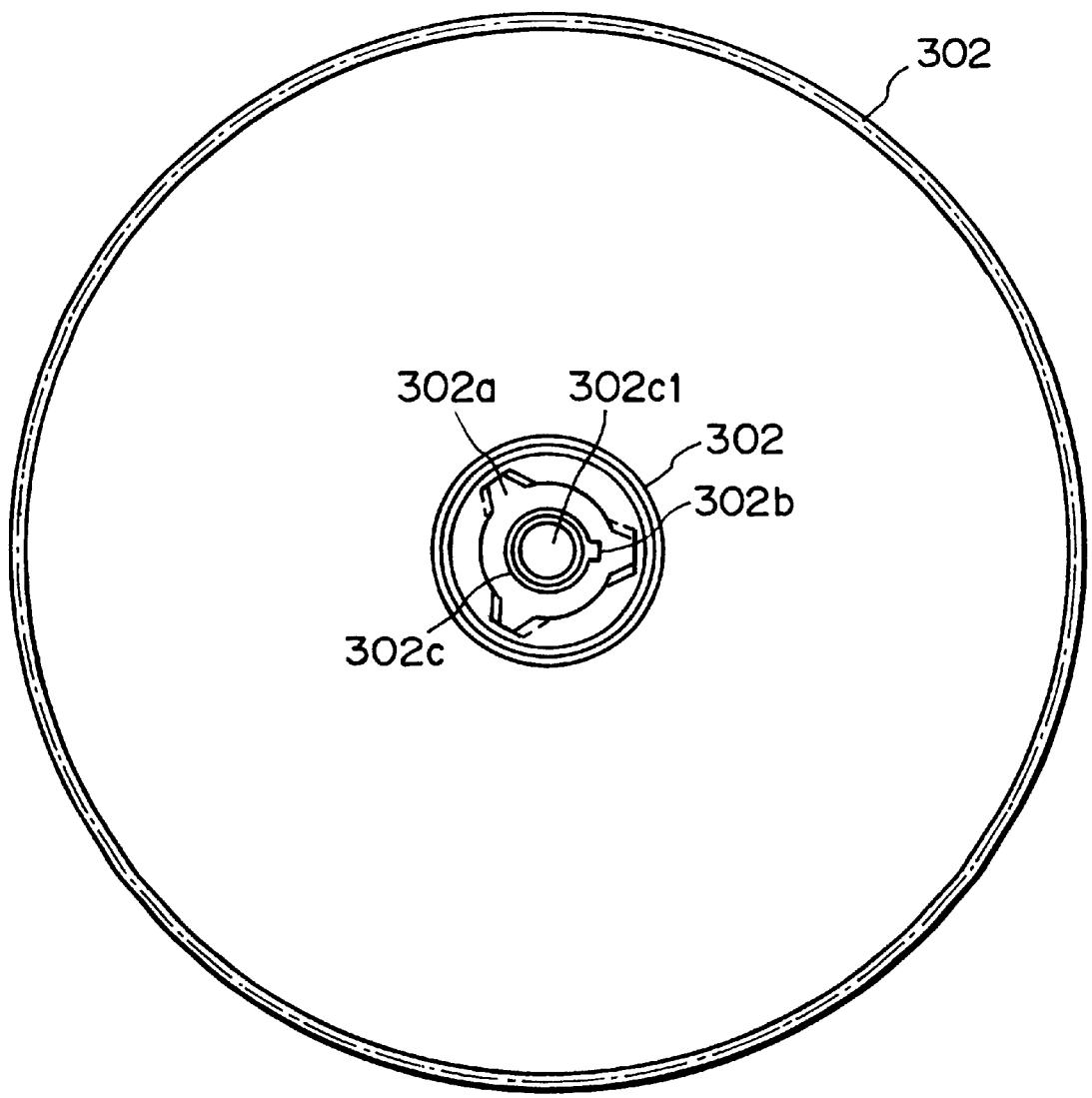
FIG. 13 is a side view of a drive transmission member provided in the main assembly of apparatus.
Figure 14:
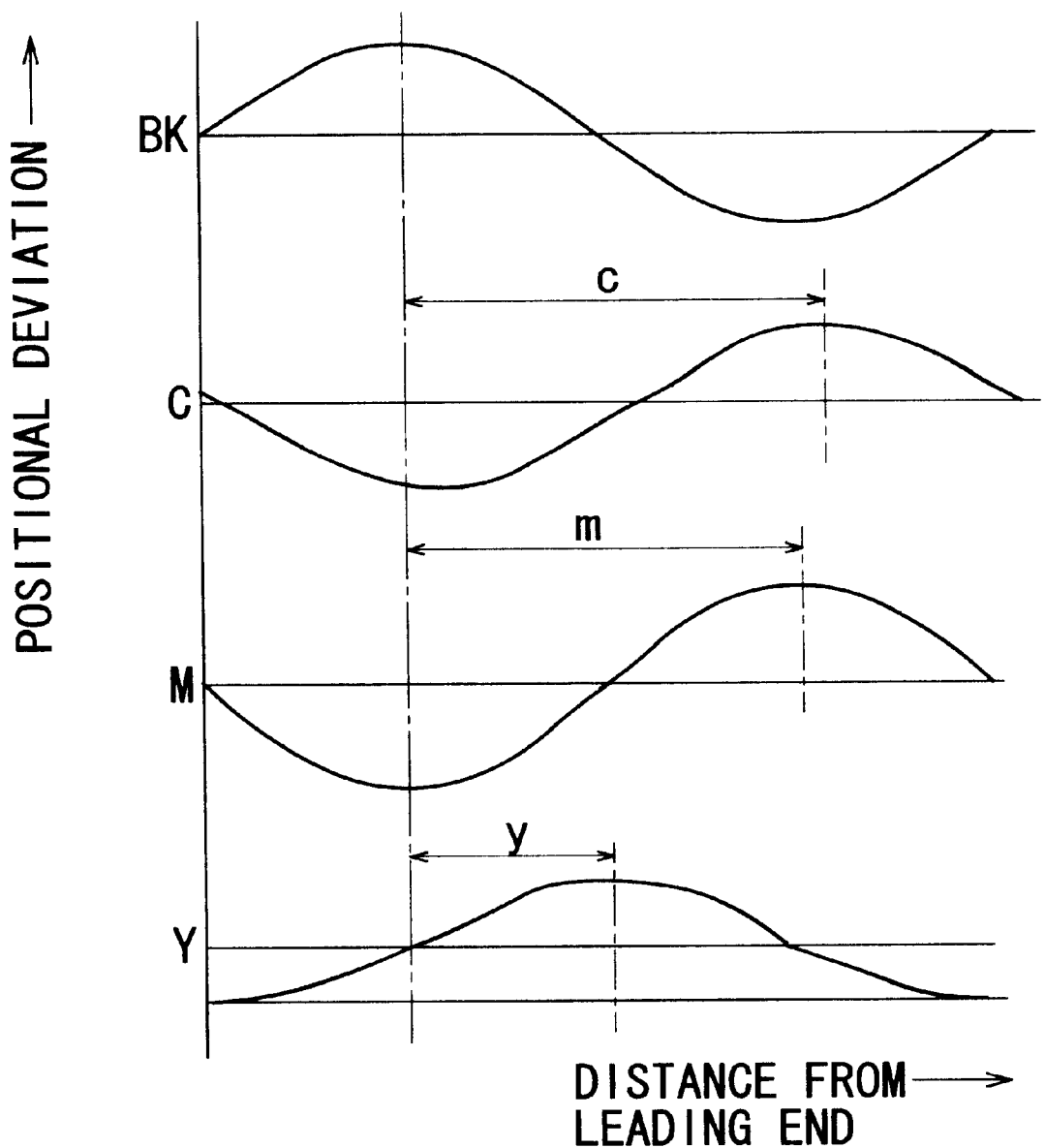
FIG. 14 is a graph showing image misregistration among different color image components.

The charging device 2 is of a contact charging type. The charging member is an electroconductive roller (2a–2d). The roller (2a–2d) is conducted to the surface of the photosensitive drum 1. The roller (2a–2d) is supplied with a charging bias voltage. By doing so, the surface of the photosensitive drum 1 is uniformly charged electrically. The scanner unit 3 is disposed substantially add the same level as the photosensitive drum 1. Image light is limited from a laser diode in accordance with image signals. The image light is deflected and projected onto the photosensitive drum by a polygonal mirror 9 (9a, 9b, 9c, 9d) rotated at a high-speed by a scanner motor (unshown). The image light reflected by the mirror 9 is projected onto the surface of the photosensitive drum 1 having been electrically charged, through an imaging lens 10 (10a, 10b, 10c, 10d). By this, an electrostatic latent image is formed on the photosensitive drum 1. As shown in FIG. 12, the unit 3 has a length longer than a pitch between left and right plates 32. A projection 33 is extended outwardly through an opening 35 formed in the side plate 32. The unit 3 is normally lodged downwardly by a spring 36. The spring 36 is a compression coil spring. The spring 36 is compressed between the projection 33 and a spring seat 32d provided in the side plate 32. By doing so, the projection 33 is firmly pressed against the abutting portion 32c. Thus, the unit 3 is correctly positioned.

The developing devices 4 comprises developer containers 41 (41a, 41b, 41c, 41d) which contains yellow, magenta, cyan and black developers, respectively. The developer in the container 41 is supplied into the developer supplying roller 43 by a feeding mechanism 42. By the functions of the supplying roller 43 and the developing blade 44 press-contacted to the developing roller 40, the developer is supplied on the outer periphery of the developing roller 40 and is elliptically charged. The supplying roller 43 and the developing roller 40 are rotated in the clockwise direction as indicated by an arrow in the Figure.

The developing roller 40 opposed to the photosensitive drum 1 on which the electrostatic latent image is formed, is supplied with a developing bias. By doing so, a developed image is formed on the photosensitive drum 1 in accordance with the latent image. Thus, the developing device 4 develops the latent image.

The electrostatic transfer belt 11 circulates while it is opposed to and contacted to all of the photosensitive drums 1a, 1b, 1c, 1d. The belt 11 has a volume resistivity of $10^{11}$–$10^{14}$ Ωcm, and has a thickness of approx. 150 µm (film. The belt 11 is generally extended vertically and supported by four rollers. A recording material S is electrostatically attracted on the left side of the outer periphery of the belt in the Figure. It is rotated so as to bring the recording material S to the photosensitive drum 1. In this manner, the recording material S fed to an image transfer station by the belt 11. The belt 11 receives the developed image from the photosensitive drum 1.

The transfer rollers 12 (12a, 12b, 12c, 12d) are disposed parallel with each other inside the belt 11 at positions opposed to the respective photosensitive drums 1a, 1b, 1c, 1d. The charge of the positive polarity is applied to the recording material S through the belt 11 from the transfer roller 12. By the electric field provided by the charge, the developed image of the negative polarity is transferred from the photosensitive drum 1 onto the recording material S which is in contact to the photosensitive drum 1.

The belt 11 has a circumferential length of approx. 700 mm and a thickness of 150 µm. The belt 11 is extended around the four rollers which are a driving roller 13, follower rollers 14a, 14b and a tension roller 15, and is rotated in the direction indicated by an arrow. In this manner, the recording material S receives the developed image while the recording material S moves from the follower roller 14a side to the driving roller 13 side.

The feeding portion 16 functions to feed the recording material S to the image formation station. In the feeding portion 16, a plurality of recording materials S are accommodated in the cassette 17. During the image formation, the feeding roller 18 (half-moon roller) and the pair of registration rollers 19 are rotated in accordance with the image forming operation. The recording material S is fed out of the cassette 17 in seriatim. The leading edge of the recording material S is abutted to a nip formed by the registration rollers, and is temporarily stopped thereby. By this, a loop of the recording material is formed. Thereafter, the recording material S is fed to the belt 11 by the registration rollers 19 in timed relation with the position of the image. The fixing portion 20 functions to fix the polarity of color images on the recording material. The fixing portion 20 comprises a heating roller 21a and a pressing roller 21b press-contacted to the heating roller 21a and applies heat and pressure to the recording material S.

The recording material S having the transferred developed image is fed by the nip formed between the fixing rollers (21a, 21b) when it is passed through the fixing portion 20. During it being fed, the heat and pressure is applied to the recording material by the pair of fixing rollers 21. By doing so, the plurality of color developed images are fixed on the recording material S.

The image forming operation will be further described. The cartridges 7a, 7b, 7c, 7d are sequentially rotated in timed relation with the image forming operation. In accordance with the driving, the photosensitive drums 1a, 1b, 1c, 1d are rotated in the counterclockwise direction. Then, scanner units 3 corresponding to the process cartridges 7 are sequentially driven. Then, the charging device 2 is operated to apply uniform electric charge on the peripheral surface of the photosensitive drum 1. Said unit 3 projects the image light to the peripheral surface of the photosensitive drum 1 in accordance with the image signal, thus exposing the peripheral surface to the image light. By doing so, an electrostatic latent image formed on the peripheral surface of the photosensitive drum 1. The developing roller 40 operates to transfer the developer to the low potential portion of the latent image to develop the latent image on the surface of the photosensitive drum 1.

The recording material S is fed in timed relation with the leading-edge of the developed image on the peripheral surface of the most upstream photosensitive drum 1. The timed relation is accomplished by the start of rotation of the registration roller 19. Thus, the recording material S is fed to the belt 11.

The recording material S is nipped between the electrostatic attraction roller 22 and the belt 11 so that it is press-contacted to the outer surface of the belt 11. Simultaneously, a voltage is applied between the belt 11 and the roller 22. By this, electric charge is induced in the dielectric layer of the belt 11 and the recording material S which is a dielectric member. Thus, the recording material S is the electrostatically attracted to the outer periphery of the belt 11. In this manner, the recording material S is stably attracted to the belt 11. It is fed to the most downstream transfer portion.

Thus, the recording material S sequentially receives, while being fed, the developed image from the photosensitive drums 1 by the functions of the respective electric fields formed between the respective photosensitive drums 1 and the transfer rollers 12.

The recording material S now having the four color developed images, is separated from the belt 11 by the curvature of the roller 13 (curvature separation). It is then fed into the fixing portion 20. The recording material S is subjected to the heat fixing operation in the fixing portion 20 so that said developed image is fixed. Thereafter, the recording material is discharged to the outside through the discharging portion 24 by the pair of discharging rollers 23.

Figure 2:
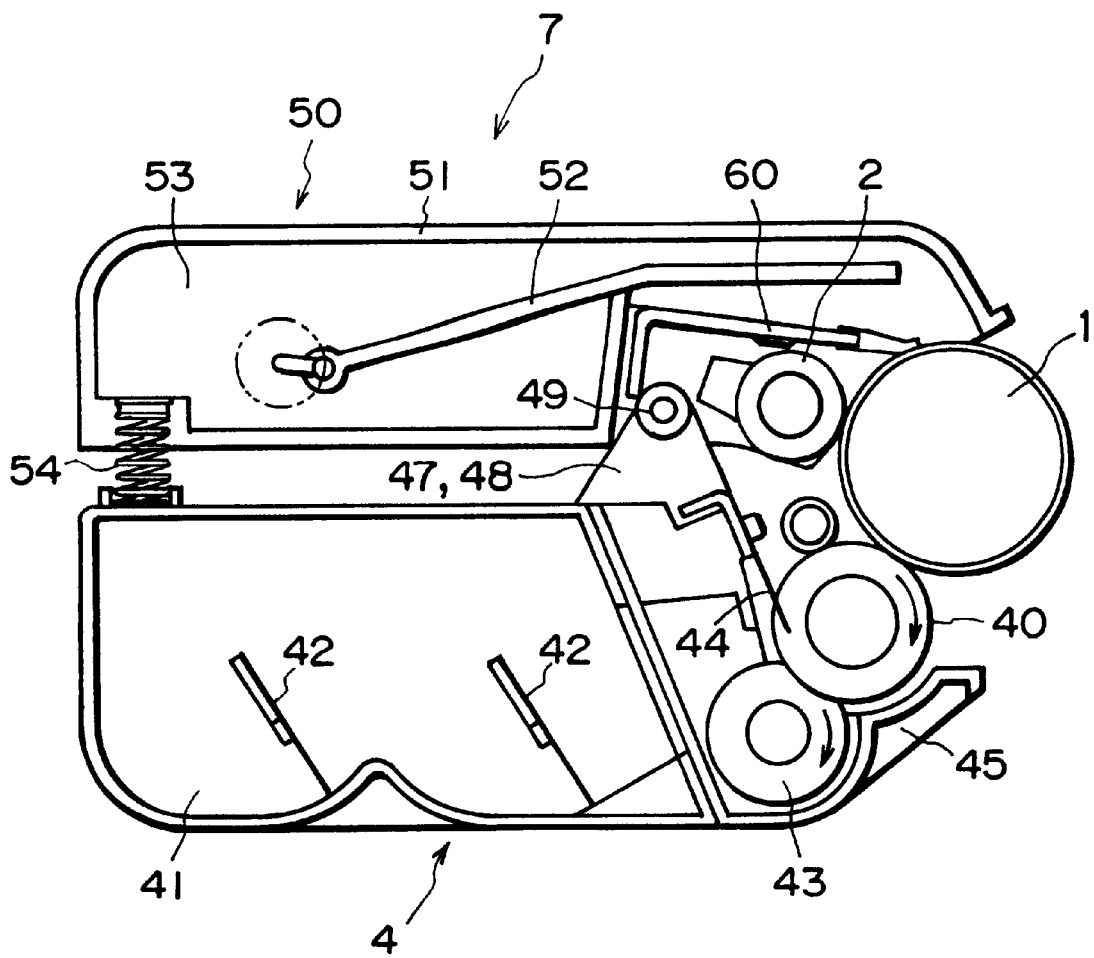
FIG. 2 is a longitudinal sectional view of a process cartridge according to an embodiment of the present invention.
Figure 3:
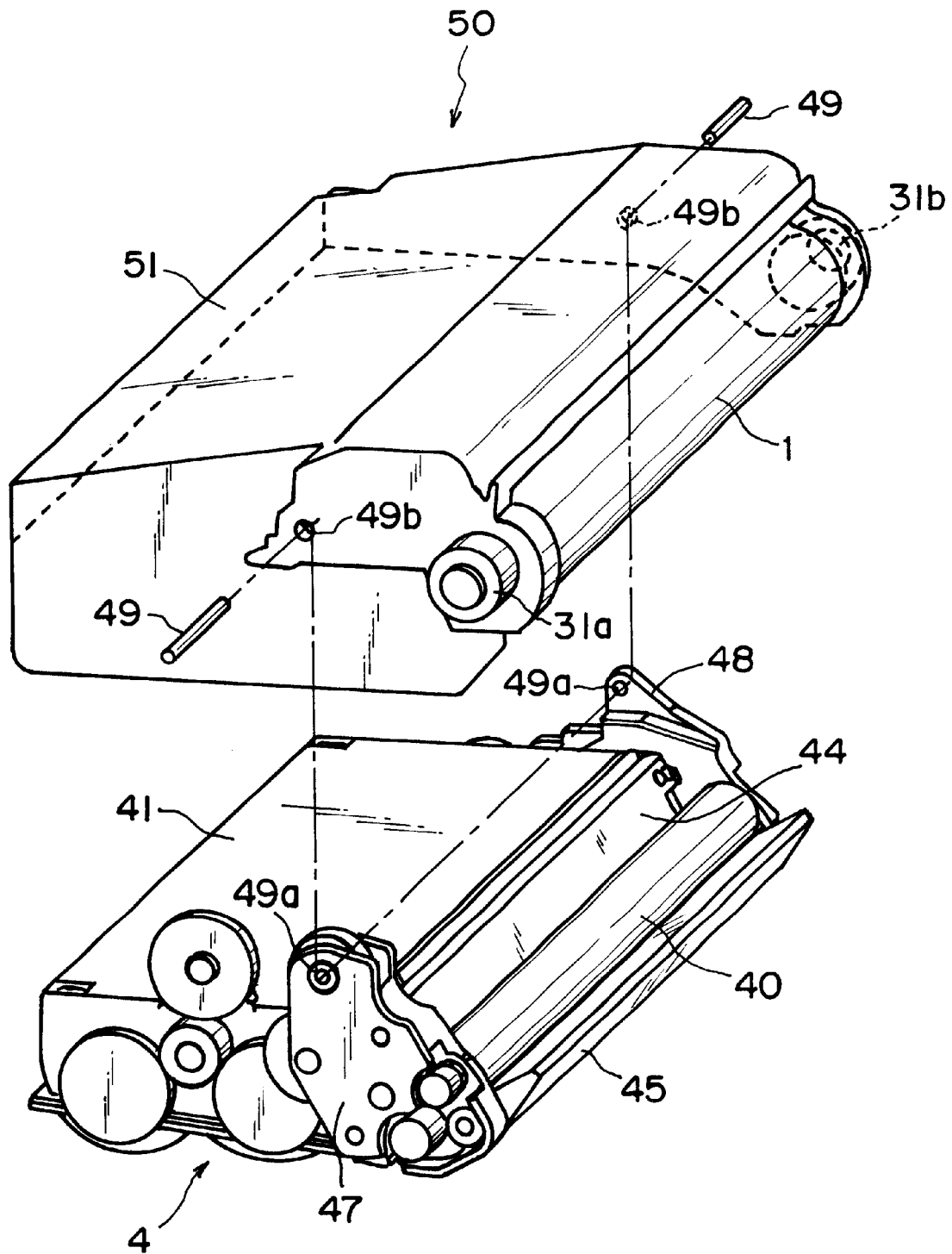
FIG. 3 is a schematic perspective view of a process cartridge according to the embodiment of the present invention.

Referring to FIGS. 2 and 3, the cartridge according to this embodiment will be described. FIGS. 2 and 3 are a main section and a perspective view of the cartridge 7 accommodating the developer. The cartridges 7a, 7b, 7c, 7d for the yellow color developer, the magenta color developer, the cyan color developer and the black color developer, have the same structure.

The cartridge 7 has a photosensitive drum unit 50 having a photosensitive drum 1, charging means and cleaning means, and developing unit 4 having developing means.

Figure 4:
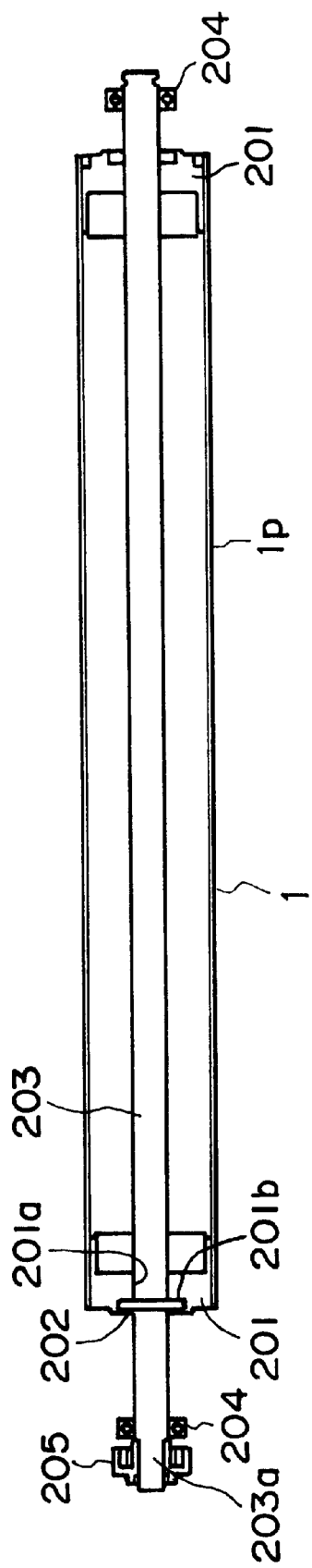
FIG. 4 is a longitudinal sectional view taken along a plane including an axis of the photosensitive drum according to the embodiment of the present invention.

The drum unit 50 is rotatably mounted to the cleaning frame 51 using a bearing 204 (FIG. 4). The bearing 204 is engaged with a bearing housing 31 (31a, 31b). The housing 31 is cylindrical which is coaxial with the bearing 204. Around the photosensitive drum 1, there are provided a charging device 2 and a cleaning blade 60 for removing the developer remaining on the photosensitive drum. The residual developer removed from the surface of the photosensitive drum 1 by the blade 60, is fended into a removed developer chamber 53 provided behind the cleaning frame by a developer feeding mechanism 52. By transmitting a driving force to the photosensitive drum 1, a motor (unshown), the photosensitive drum 1 is rotated in accordance with the image forming operation.

The developing unit 4 comprises the photosensitive drum 1, the developing roller 40, the developer container 41 and the developing device frame 45. The developing roller 40 is rotatably supported on the developing device frame 45 through a bearing member. On the surface of the developing roller 40, the roller 43 and the developing blade 44 are contacted. In the container 41, there is provided a toner feeding mechanism 42 for stirring the developer therein and feeding the developer to the 43 supplying roller 43.

The supporting holes 49a formed in bearing members 47, 48 provided at the opposite ends of the developing unit 4 and the hole 49b as of the cleaning frame 51 are aligned. By inserting the holes 49a, 49b, the developing unit 4 is pivotably supported on the drum unit 50. Thus, a pivotable structure is provided. As for the cartridge 7 per se (in the state not mounted to the main assembly of the printer), the developing unit is normally urged by the pressing spring 54 such that developing roller 40 is contacted to the photosensitive drum 1 by the rotation moment about the pin 49. The spring 54 is a compression coil spring. The spring 54 is disposed between the cleaning frame 5 and the developer container 41 at a side opposite from the photosensitive drum 1 with the support pin 49 therebetween.

In a contact developing system used in this embodiment, in which the photosensitive drum 1 and the developing roller 40 are contacted to each other, it is preferable that photosensitive drum 1 is rigid and the developing roller 40 is elastic. The elastic member may comprises a solid rubber monolayer or comprises a solid rubber layer and a resin material coating thereon in consideration of the charging property for the toner.

Referring to FIG. 12, mounting means for mounting the cartridge 7 to the main assembly 100 of the apparatus will be described.

As shown in FIG. 12, the cartridge 7 is mounted to the main assembly 100 by inserting the bearing housing 31 along the first guide groove 34 in a direction indicated by an arrow E. The bearing housing 31 is press-contacted to the abutment surfaces 37, 38 of the guide groove 34. By doing so, the position of the cartridge 7 is determined. The cartridge 7 is urged in the main assembly of the printer in the following manner. Pins 39 are crimped on the left and right plates 32. A twisted coil spring 30 is supported on pins 39, and end 30a thereof is fixed in the hole 32a and is of the left and right plates. The other end portion 30b of the spring 30 has a V-shaped configuration so as to enter the track of the bearing housing 31 when the cartridge 7 is mounted or demounted. When the cartridge 7 is not mounted to the main assembly of the apparatus, the spring 30 is bent, and the rotation is limited by the bent and erected portion 32b. When the cartridge 7 is inserted, the other end portion 30b is rotated by the housing 31, and when the other end portion 30b rises over the housing 31, the positions are as shown in FIG. 12. In the state, the cartridge 7 is pressed by the spring 30 in the direction of an arrow F with approximately 1 kgf.

The inner walls of the side plates 32 are provided with projected guides 32c. The guide 32c is engaged by a guide groove (unshown) provided in the cleaning frame 51. The engagement between the guide 32c and the guide groove are loose so as not to influence the positioning of the housing 31. By doing so, the rotation of the cartridge 7 about the housing 31 is limited.

Figure 5:
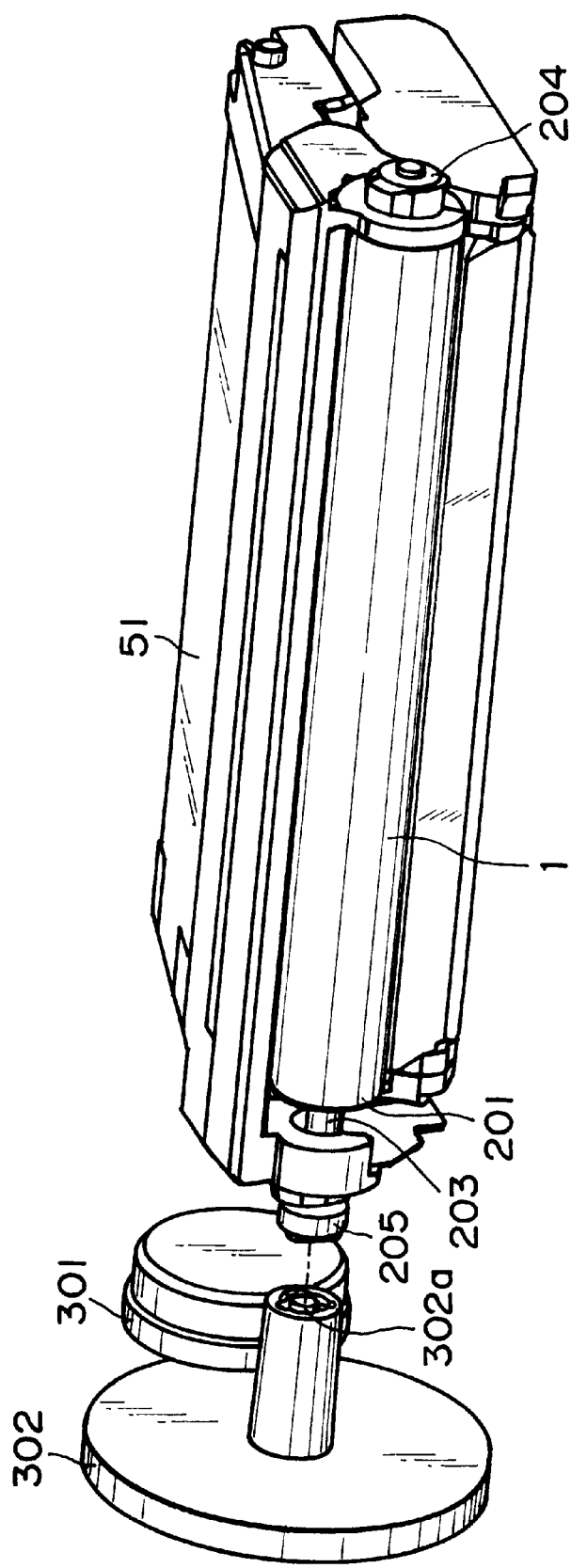
FIG. 5 is a perspective view of a driving force transmitting portion between the main assembly of apparatus and the process cartridge.

FIG. 4 is a sectional view of the photosensitive drum unit, and FIG. 5 is a perspective view of a process cartridge. Into the opposite ends of the photosensitive drum cylinder lp of a hollow cylindrical shape, flanges 201 are press-fitted, respectively.

Each of the flange 201 is provided with a hole 201a coaxial with the drum cylinder lp.

A pin 202 is inserted into a hole formed at the center of the shaft 203. Thereafter, the shaft 203 is penetrated through the holes 201a. Then, the pin 202 engaged with the groove 201b of the flange 201. By doing so, the shaft 203, the flange 201 and drum cylinder lp are integrally rotatable.

The end of the shaft 203 is engaged with a bearing member 204 press-fitted in the cleaning frame 51. By this, the shaft 203 is rotatably support on the frame. A D-cut hole of the driving force receiving member 205 is press-fitted into a correspondingly D-cut portion 203a at one end of the shaft 203. By doing so, the shaft 203 and the driving force receiving member 205 are integrally rotatable.

Thus, the driving force receiving member 205 and the photosensitive drum cylinder lp are integrally rotatable.

Figure 6:
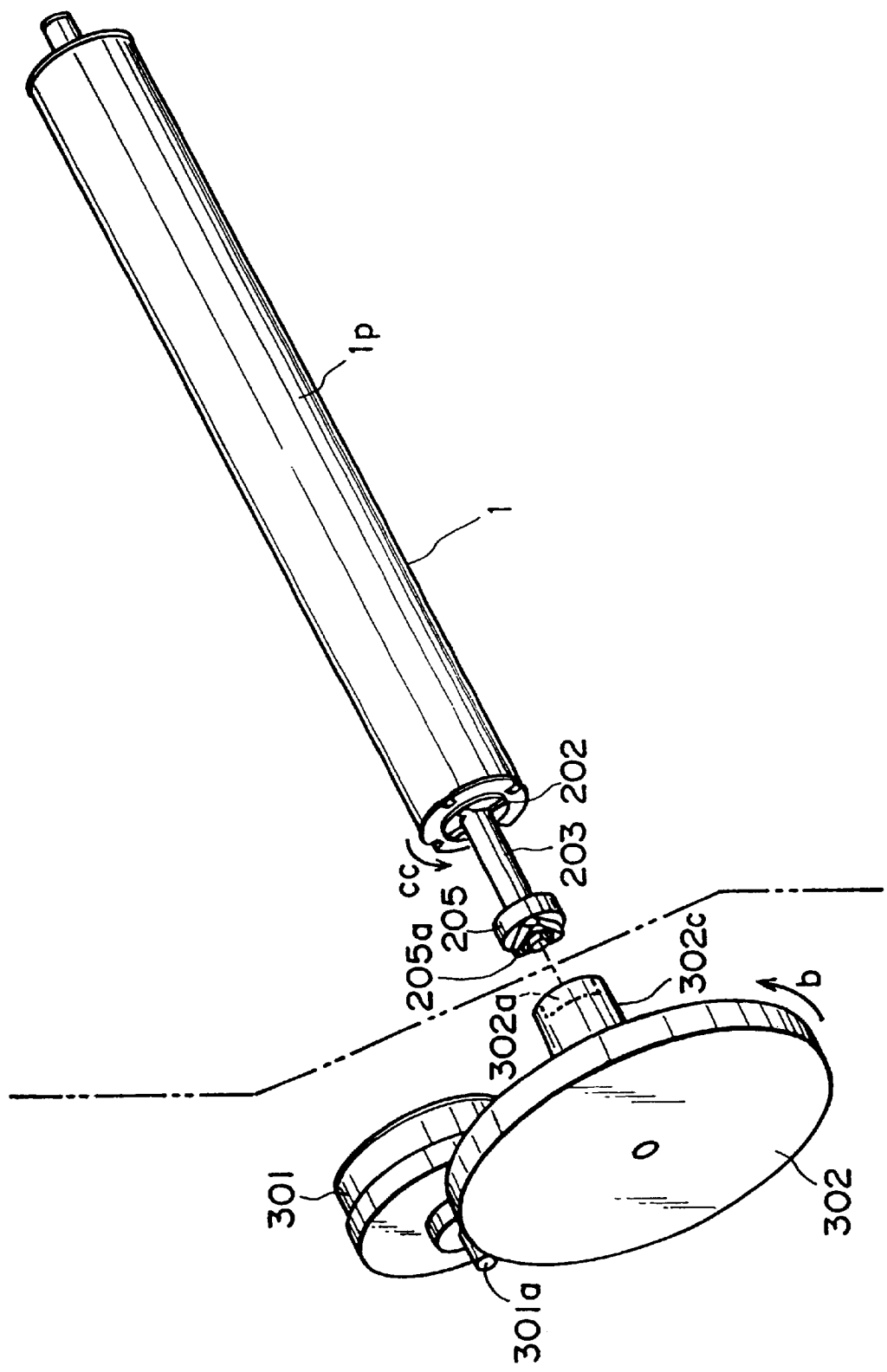
FIG. 6 is a perspective view of the drive transmitting portion according to the embodiment of the present invention.

FIG. 6 is a schematic view illustrating a driving method for photosensitive drum 1 in this embodiment. In this Figure, any elements except for the photosensitive drum 1 and the driving member are omitted for better understanding. The right side of the chain line is the cartridge 7 side, and the left side is the main assembly side.

When the cartridge 7 is inserted into the main assembly 100 of the apparatus, the drum driving gear 302 of the main assembly 100 of the apparatus slides in the direction indicated by an arrow against the pressure provided by the spring (unshown). The twisted hole (recess) 302a (FIG. 11) provided at the free end of the shaft 302c of the gear 302 is engaged with a twisted triangular prism 205a provided in the driving force receiving member 205 formed at the free end of the shaft of the photosensitive drum unit 50. The twisted hole (recess portion) 302a has a substantially equilateral triangle section. The triangular prism 205a has a substantially equilateral triangle section.

In operation, the motor 301 in the main assembly 100 of the apparatus is driven. By this, the gear 302 which is in meshing engagement with a pinion 301a of a motor shaft of the motor 301 rotates (in the direction indicated by an indicated by the arrow b). By this, the drum cylinder lp which is rotatably integrally with the shaft rotates in the direction indicated by the arrow cc through a member 205 engaged with the hole (recess) 302a.

The triangular prism 205a and the twisted hole (recess) 302a may be replaced with each other.

The direction of twisting of the triangular prism is such that when it is rotated, the hole (recess 302a) and the triangular prism are pulled toward each other. By doing so, the engagement between the triangular prism 205a and the recess 302a are retained during the rotation.

Figure 7:
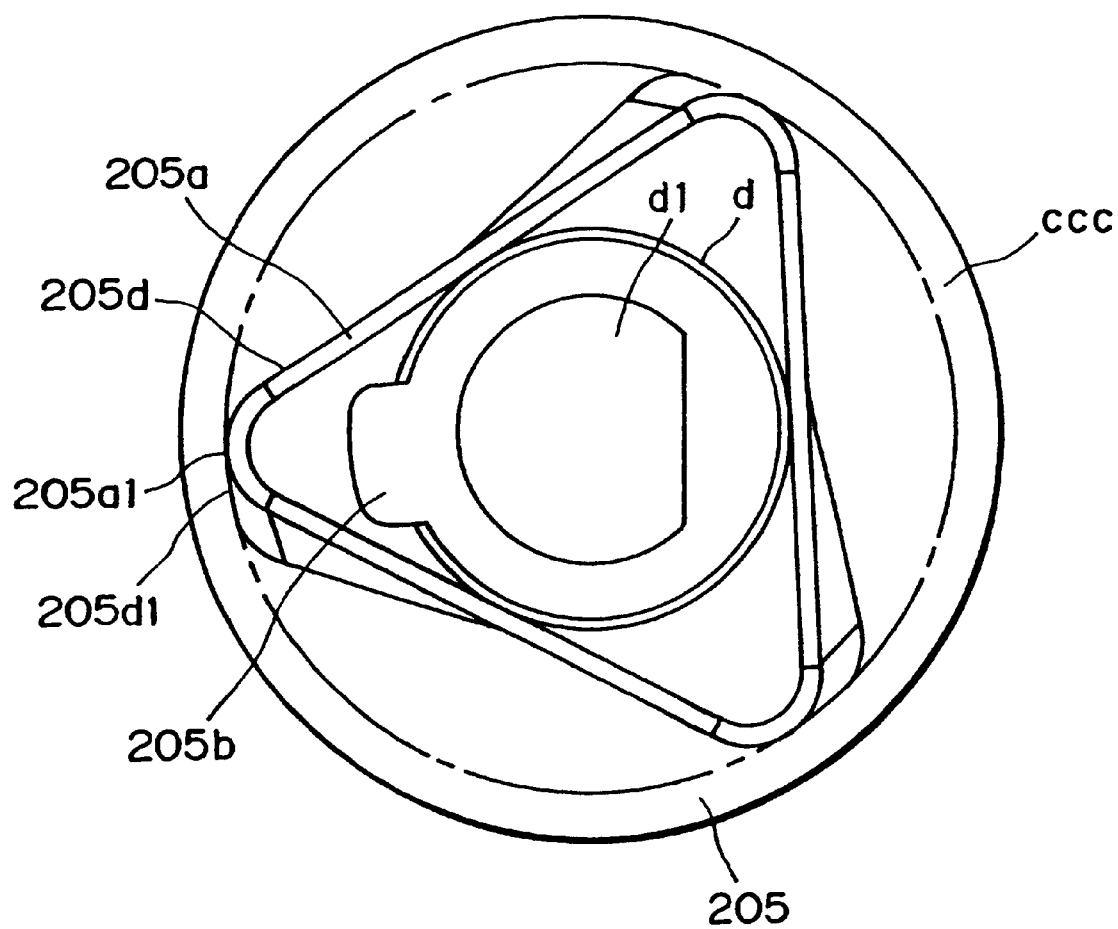
FIG. 7 is a front view of a driving force receiving member according to the embodiment of the present invention.
Figure 8:
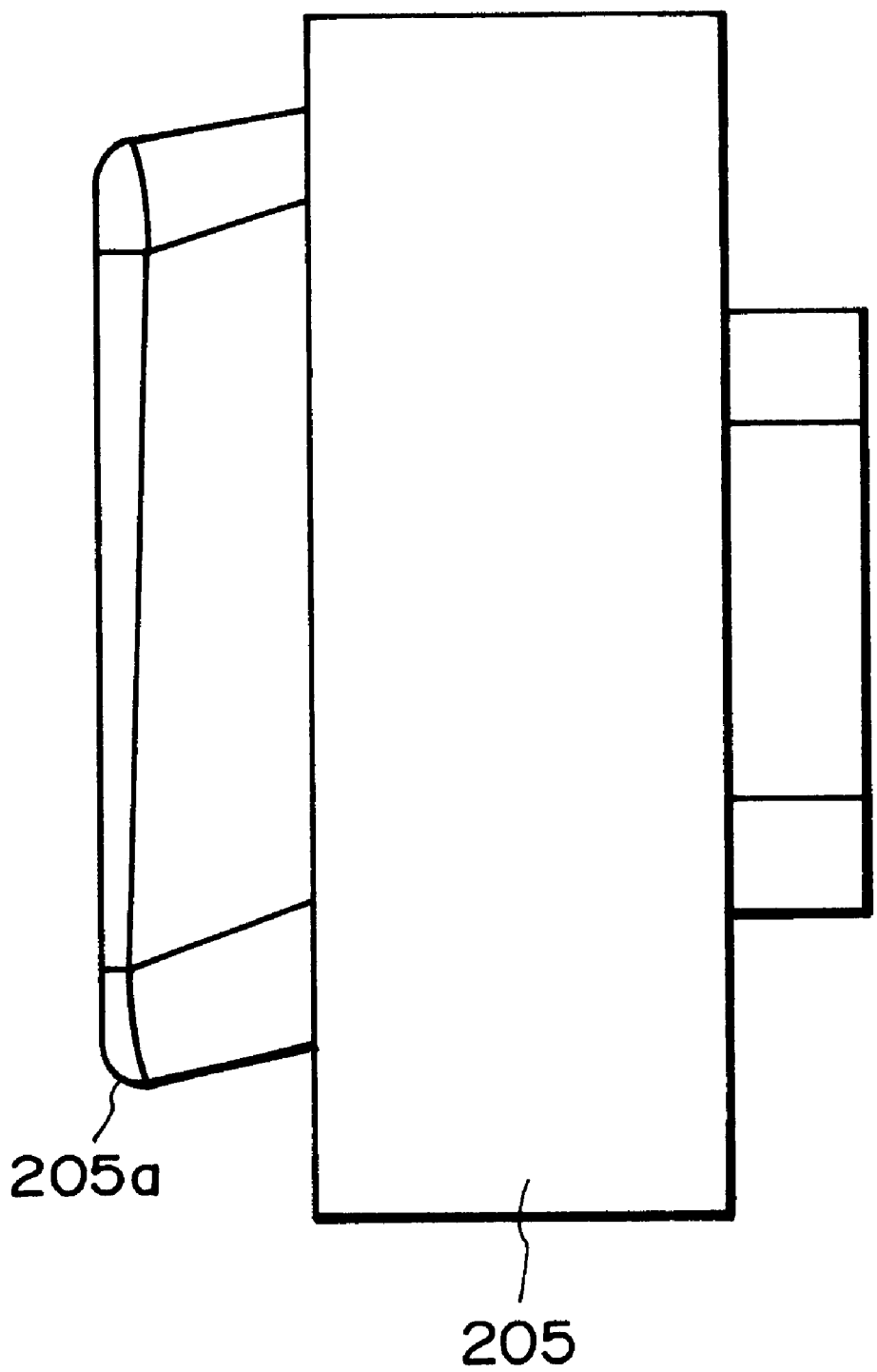
FIG. 8 is a side view of the device shown in FIG. 7 according to the embodiment of the present invention.
Figure 9:
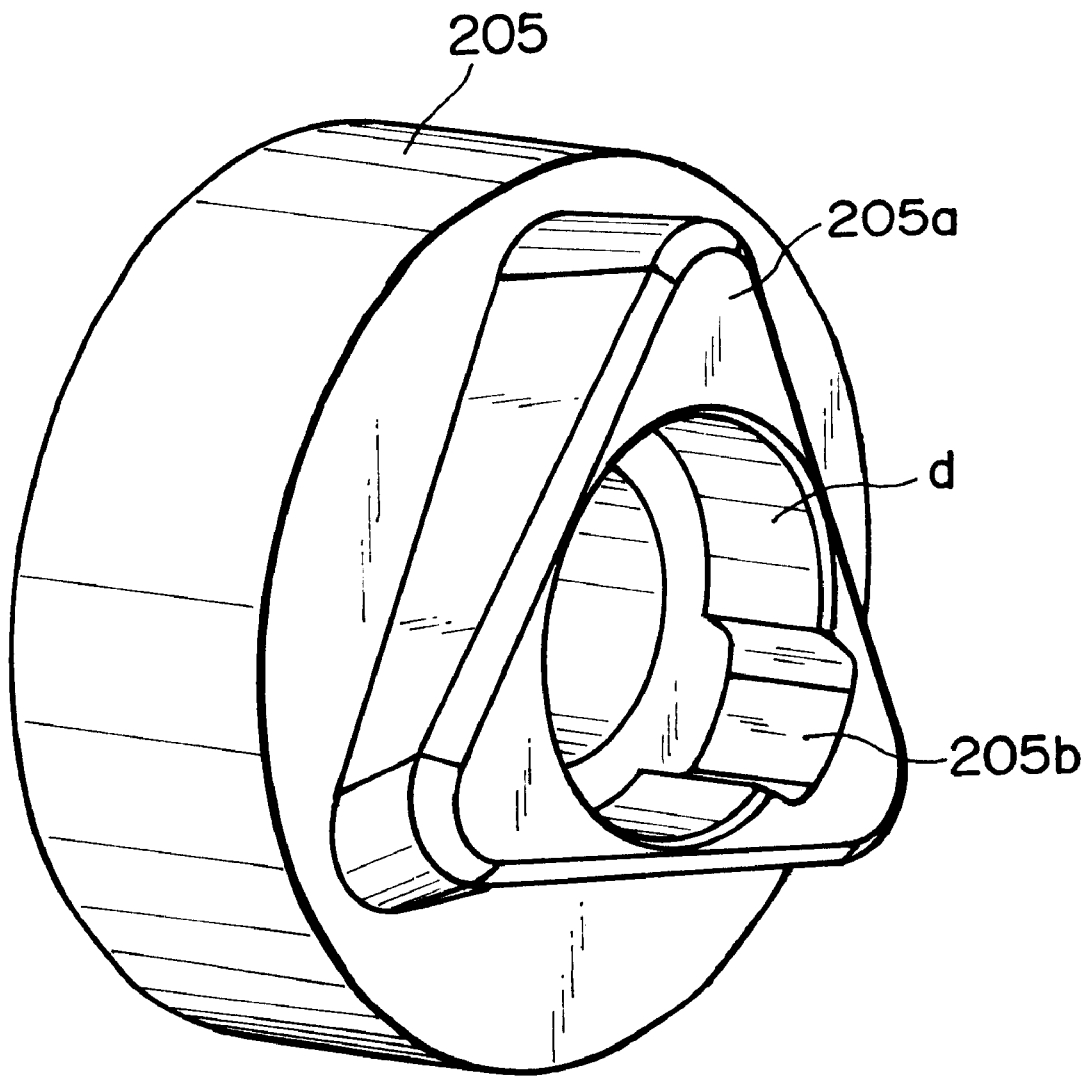
FIG. 9 is a perspective view of a driving force receiving member according to the embodiment of the present invention.
Figure 10:
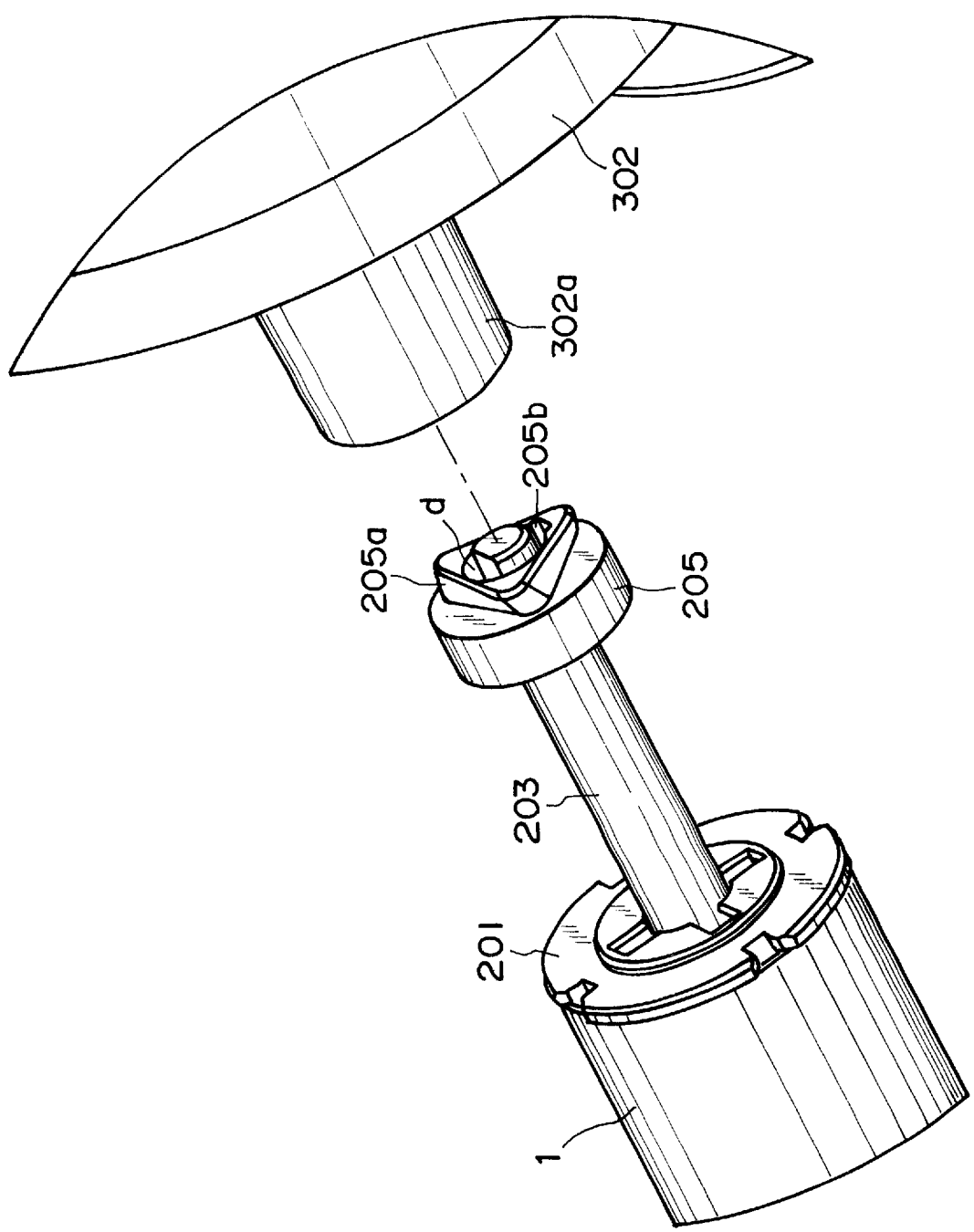
FIG. 10 is a perspective view of a driving force transmitting portion according to the embodiment of the present invention.
Figure 11:
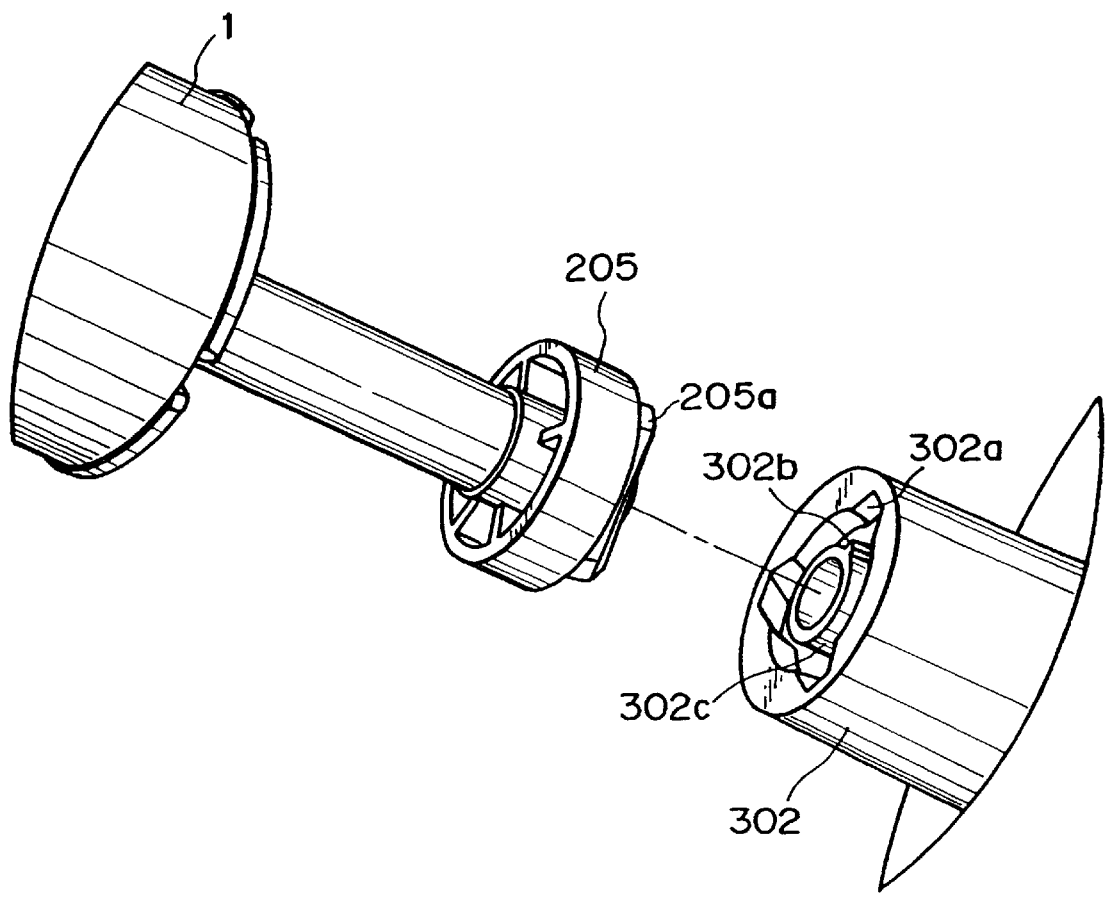
FIG. 11 is a perspective view of a driving force transmitting portion according to the embodiment of the present invention.

FIG. 7 through FIG. 9 show details of the driving force receiving member 205, and FIGS. 10, 11 schematically shows structures of the member 205 and the gear 302.

The member 205 is integrally molded of resin material. For the purpose of accurate molding without shrinkage and for the purpose of uniform thickness, the apex (corner portions) portions of the triangular prism 205a are rounded so as to be contacted to a circle ccc concentric with the equilateral triangle. And, a hole in the form of a circle d concentric with the equilateral triangle is formed.

Correspondingly, the corner portions of the hole (recess) 302a are made thicker for contact with a circle concentric with the equilateral triangle.

As described hereinbefore, the image formation position periodically changes due to the fluctuation of rotation of the drum unit 50 and the accuracy of the gear 302.

In order to eliminate the variation of the image formation position occurring at the period of the circumferential length of the photosensitive drum, a test pattern is formed. The position of the test pattern image is read by the main assembly 100. On the basis of the results of the reading, calibrations including rotational speed control of the motor 301 are carried out.

However, it is possible that phase difference between the drum unit and the drum driving gear changes due to mounting-and-demounting of the process cartridge. Therefore, the calibrations have to be renewed each time the cartridge is mounted to the main assembly.

In this embodiment, the gear 302 is provided with a projection 302b, as shown in FIG. 11. On the other hand, the cartridge driving force receiving member 205 is provided with a recess 205b in the circle d, correspondingly to the projection 302b. By the engagement of the projection 302b with the recess 205b, the phase of the engagement is determined at a constant phase. The projection 302b is integral with a generating line of the cylindrical portion 302c provided at the center of rotation of the recess 302a. A cylindrical hole d engageable with the cylindrical portion 302c is provided at the center of the driving force receiving member 205 (triangular prism 205a). The cylindrical portion 302c is smaller than the inscribed circle of the triangular prism 205a. Where the twisted projection having a non-circular cross-section and a plurality of corner portions, as an example of the twisted triangular prism 205a, what is required is the driving force receiving portions of the receiving member 205 distributed at 120° intervals are not rotated relative to the driving force transmission member 302. Therefore, the engagement between the recess 205b and the projection 302b may be quite loose.

With this structure, the number of phase detection and phase control operations for avoiding the phase deviations in the drum driving gear and the photosensitive drum, can be reduced so that image formation time can be reduced.

In this manner, the driving force receiving member is provided with a recess for engagement with the projection, provided in the driving force transmission member of the main assembly of the image forming apparatus, for the phase determination, and therefore, the number of phase detection and phase control operations required for eliminating of the color misregistrations due to the non-uniform rotations of the gear and the electrophotographic photosensitive drum, can be reduced. Accordingly, an image without image non-uniformity or color misregistrations can be formed quickly with high printing accuracy, by the electrophotographic image forming apparatus.

The description will be made as to the cartridge 7 per se.

The cartridge 7 is detachably mountable to the main assembly 100 of the electrophotographic image forming apparatus for forming an image on the image bearing member. The main assembly 100 comprises a driving rotatable member (e.g., drum driving gear 302) for transmitting the driving force from the motor 301, a non-circular twisted recess 302a having a cross-section with a plurality of corner portions, the recess 302a being rotatable integrally with the driving rotatable member. The process cartridge 7 comprises an electrophotographic photosensitive drum, a process means actable on the electrophotographic photosensitive drum 1 (e.g., at least one of a charging device 2, a developing device 4 and the cleaning device 6), a non-circular twisted projection (e.g., triangular prism 205a) having a cross-section with a plurality of corner portions, the projection being provided at a longitudinal end of the electrophotographic photosensitive drum and being engageable with the recess (e.g., hole 302a), a permitting portion (e.g., recess 205b) for permitting engagement at a predetermined engaging position with respect to the rotational direction when the projection and the recess 302a are brought into engagement with each other. When the process cartridge 7 is mounted to the main assembly 100 of the apparatus, the twisted projection (triangular prism 205a) is engaged with the recess (hole 302a), the driving rotatable member (gear 302) is rotated, and the rotating force is transmitted from the driving rotatable member (gear 302) to the electrophotographic photosensitive drum 1. The permitting portion is in the form of a recess 205b. The twisted projection (triangular prism 205a) and the twisted recess (hole 302a) are engaged only when the permitting portion is aligned with the projected portion (projection 302b) provided inside the twisted recess 302a.

The twisted projection (triangular prism 205a) is provided with the circular recess (cylindrical hole d) provided inside the twisted projection (triangular prism 205a). The permitting portion is formed extended toward the outer surface 205d of the twisted projection (triangular prism 205a) from the peripheral surface of the circular recess (cylindrical hole d).

The permitting portion is extended toward the outer surface 205d1 of one of the rounded corner portion 205a1 of the twisted projection (triangular prism 205a).

The bottom surface of the circular recess (cylindrical hole d) is provided with an opening d1 through which the drum shaft 203 for supporting the photosensitive drum 1 on the cartridge frame the (drum unit 50) is penetrated.

The twisting recess 302a comprises an opening 302cl provided also in the bottom surface of the twisted recess 302a, a circular projection (cylindrical portion 302c) projected toward inside of the recess 302a around the opening 302cl, and a projected portion (projection 302b) projected toward the inner surface of the twisted recess 302a from the outer surface of the circular projection. The twisted projection (triangular prism 205a) comprises a circular recess (cylindrical hole d), provided inside the twisted protection, for engagement with the circular projection (cylindrical portion 302c), and a permitting portion in the form of a permission recess (recess 205b) extended toward the outer surface 205d of the twisted projection (triangular prism 205a) from the peripheral surface of the circular recess. The twisted projection and twisted recess are engaged with each other only at the phase or position where the permission recess (recess 205b) is aligned with and therefore engaged with the projected portion (projection 302b), so that rotational or angular relative relationship between the projection (triangular prism 205a) and the recess 302a is constant when they are brought in the engagement with each other.

Here, the twisted recess (hole 302a) has a cross-section with three corner portions. The projected portion (projection 302b) is provided so as to extend toward the outer surface of one of the corner portions. The permission recess (recess 205b) is extended toward the outer surface 205dl of one of the rounded corner portions 205al of the projection (triangular prism 205a).

The embodiment of the present invention is summarized as follows:

An electrophotographic image forming apparatus for an image on a recording material, comprising a motor (301); a driving rotatable member (e.g. drum driving gear 302) for transmitting a driving force from the motor (301); a twisted recess (302a) provided at a central portion of the driving rotatable member (302) and having a non-circular cross-section with a plurality of corners, the recess being rotatable integrally with the driving rotatable member; a mounting portion (100a–100d) for mounting a process cartridge, said process cartridge including an electrophotographic photosensitive drum (1); process means (e.g. at least one of the charging device 2, developing device 4, the cleaning device 6) actable on said electrophotographic photosensitive drum (1); a twisted projection (e.g. triangular prism 205a) having a non-circular cross-section with a plurality of corners, said twisted projection being provided at one longitudinal end of said electrophotographic photosensitive drum and being engageable with the recess (302a); a permitting portion (e.g. 205b) for permitting engagement between said twisted protection and said recess only at a predetermined relative rotational position therebetween to establish the engagement therebetween with the predetermined relative to rotational position; wherein when said process cartridge is mounted to the main assembly of the apparatus, the rotating force is transmitted from the driving rotatable member to said electrophotographic photosensitive drum by rotation of the driving rotatable member with the twisted projection being in engagement with the recess.

In the case of the color electrophotographic image forming apparatus, a plurality of pairs of the recess and the mounting portion are provided. In the foregoing embodiment, the permitting portion is in the form of a recess, but the permitting portion may be projection. In such a case, the main assembly side is a recess. The configuration of the twisted projection is not limited to the triangular prism, but other configurations are usable. In that case, the configuration of the twisted recess is selected correspondingly. The process means is at least one of a developing member (developing device 4) for developing the electrostatic latent image formed on the photosensitive drum 1, a charging member (charging device 2) for charging the photosensitive drum 1, and a cleaning member (cleaning device 6) for removing the developer remaining on the photosensitive drum 1.

In the case of the color electrophotographic image forming apparatus, the process cartridges containing different color (black, cyan, yellow and magenta) developers, are simultaneously loaded in the main assembly 100 of the apparatus. As described in the foregoing, there is provided a driving force receiving member 205 having a twisted projection (triangular prism 205a). The projection is provided with a recess for accepting in the phase determination projection 302b provided in the driving force transmission member. As described in the foregoing, according to the present invention, the angular position of engagement between the twisted recesses and the projection can be made constant.

While the invention has been described with reference to the structures disclosed herein, it is not confined to the details set forth and this application is intended to cover such modifications or changes as may come within the purpose of the improvements or the scope of the following claims.

What is claimed is:

1. A process cartridge detachably mountable to a main assembly of an electrophotographic image forming apparatus for forming an image on a recording material, the electrophotographic image forming apparatus including a motor, a driving rotatable member for transmitting a driving force from the motor, and a twisted recess provided at a central portion of the driving rotatable member and having a non-circular cross-section with a plurality of corners, the twisted recess being rotatable integrally with the driving rotatable member, said process cartridge comprising:

an electrophotographic photosensitive drum;

process means actable on said electrophotographic photosensitive drum;

a twisted projection having a non-circular cross-section with a plurality of corners, said twisted projection being provided at one longitudinal end of said electrophotographic photosensitive drum and being engageable with the twisted recess; and a permitting portion for permitting engagement between said twisted projection and the twisted recess only at a predetermined relative rotational position therebetween to establish the engagement therebetween with the predetermined relative rotational position, wherein when said process cartridge is mounted to the main assembly of the apparatus, the driving force is transmitted from the driving rotatable member to said electrophotographic photosensitive drum by rotation of the driving rotatable member with said twisted projection being in engagement with the twisted recess.

2. A process cartridge according to claim 1, wherein said permitting portion is in the form of a recess, and said twisted projection and the twisted recess are engaged with each other when said permitting recess is engaged with a projected portion provided inside the twisted recess to establish the engagement with the predetermined relative rotational position between said twisted projection and the twisted recess.

3. A process cartridge according to claim 2, wherein said twisted projection is provided with a circular recess inside said twisted projection, and said permitting recess extends from a periphery of said circular recess toward an outer surface of said twisted projection.

4. A process cartridge according to claim 3, wherein said plurality of corners of said twisted projection comprise rounded corner portions of said twisted projection, and wherein said permitting recess extends toward the outer surface of said twisted projection at one of said rounded corner portions of said twisted projection.

5. A process cartridge according to claim 3 or 4, wherein a bottom surface of said circular recess is provided with an opening, through which a drum shaft extends for supporting said electrophotographic photosensitive drum on a cartridge frame.

6. A process cartridge according to claim 1, wherein the twisted recess includes an opening provided in a bottom surface of the twisted recess, a circular projection projecting toward the inside of the recess, and a projected portion projecting toward an inner surface of the twisted recess, wherein said twisted projection is provided inside the twisted recess and includes a circular recess engageable with the circular projection, and a permitting recess as said permitting portion extending toward an outer surface of said twisted projection from the peripheral surface of said circular recess, wherein said twisted projection and the twisted recess are engaged at such a position where said permitting recess is engaged with the projected portion to provide a constant relative rotational position between said twisted projection and the twisted recess when they are engaged.

7. A process cartridge according to claim 6, wherein said plurality of corners of said twisted projection comprise rounded corner portions, wherein the twisted recess has a cross-section with three corner portions, wherein the projected portion extends toward an outer surface at one of the corner portions of the twisted recess, and wherein said permitting recess extends toward an outer surface at one of said rounded corner portions of said twisted projection.

8. A process cartridge according to claim 1, wherein said process means includes at least one of a developing member for developing an electrostatic latent image formed on said electrophotographic photosensitive drum, a charging member for charging said electrophotographic photosensitive drum, and a cleaning member for removing the developer remaining on said electrophotographic photosensitive drum.

9. A process cartridge according to claim 1, wherein the electrophotographic image forming apparatus is a color electrophotographic image forming apparatus, and a plurality of said process cartridges containing different color developers are simultaneously loaded in the main assembly of the apparatus.

10. A process cartridge detachably mountable to a main assembly of a color electrophotographic image forming apparatus for forming an image on a recording material, the electrophotographic image forming apparatus including a motor, a gear for transmitting a driving force from the motor, and a twisted recess provided at a central portion of the gear and having a non-circular cross-section with a plurality of corners, the twisted recess being rotatable integrally with the gear, said process cartridge comprising:

an electrophotographic photosensitive drum;

a developing member for developing an electrostatic latent image formed on said electrophotographic photosensitive drum;

a charging member for charging said electrophotographic photosensitive drum;

a twisted projection having a non-circular cross-section with a plurality of corners comprising rounded corner portions, said twisted projection being provided at one longitudinal end of said electrophotographic photosensitive drum and being engageable with the twisted recess, wherein said twisted projection is provided with a circular recess provided inside said twisted projection; and a permitting portion for permitting engagement between said twisted projection and the twisted recess only at a predetermined relative rotational position therebetween to establish the engagement therebetween with the predetermined relative rotational position, wherein said permitting portion extends from a periphery of said circular recess toward an outer surface of said twisted projection at one of said rounded corner portions of said twisted projection, wherein when said process cartridge is mounted to the main assembly of the apparatus, the driving force is transmitted from the gear to said electrophotographic photosensitive drum by rotation of the gear with said twisted projection being in engagement with the twisted recess.

11. A process cartridge according to claim 10, wherein a bottom surface of said circular recess is provided with an opening, through which a drum shaft for supporting said electrophotographic photosensitive drum on a cartridge frame extends.

12. An electrophotographic photosensitive drum usable with an electrophotographic image forming apparatus for forming an image on a recording material, the electrophotographic image forming apparatus including a motor, a driving rotatable member for transmitting a driving force from the motor, and a twisted recess provided at a central portion of the driving rotatable member and having a non-circular cross-section with a plurality of corners, the twisted recess being rotatable integrally with the driving rotatable member, said electrophotographic photosensitive drum comprising:

a. a cylinder having a photosensitive layer on a peripheral surface thereof;

b. a twisted projection having a non-circular cross-section with a plurality of corners, said twisted projection being provided at one longitudinal end of said cylinder and being engageable with the twisted recess; and c. a permitting portion for permitting engagement between said twisted projection and the twisted recess only at a predetermined relative rotational position therebetween to establish the engagement therebetween with the predetermined relative rotational position, wherein when said electrophotographic photosensitive drum is mounted to a main assembly of the apparatus, the driving force is transmitted from the driving rotatable member to said electrophotographic photosensitive drum by rotation of the driving rotatable member with said twisted projection being in engagement with the twisted recess.

13. An electrophotographic photosensitive drum according to claim 12, wherein said permitting portion is in the form of a recess, and said twisted projection and the twisted recess are engaged with each other when said permitting recess is engaged with a projected portion provided inside the twisted recess to establish the engagement with the predetermined relative rotational position between said twisted projection and the twisted recess.

14. An electrophotographic photosensitive drum according to claim 13, wherein said twisted projection is provided with a circular recess inside said twisted projection, and said permitting recess extends from a periphery of said circular recess toward an outer surface of said twisted projection.

15. An electrophotographic photosensitive drum according to claim 14, wherein said plurality of corners of said twisted projection comprise rounded corner portions, and wherein said permitting recess extends toward the outer surface of said twisted projection at one of said rounded corner portions of said twisted projection.

16. An electrophotographic photosensitive drum according to claim 14 or 15, wherein a bottom surface of said circular recess is provided with an opening, through which a drum shaft for supporting said electrophotographic photosensitive drum on a cartridge frame extends.

17. An electrophotographic photosensitive drum usable with a color electrophotographic image forming apparatus for forming an image on a recording material, the color electrophotographic image forming apparatus including a motor, a gear for transmitting a driving force from the motor, and a twisted recess provided at a central portion of the gear and having a non-circular cross-section with a plurality of corners, the twisted recess being rotatable integrally with the gear, said electrophotographic photosensitive drum being usable with a process cartridge which is detachably mountable to the color electrophotographic image forming apparatus, said electrophotographic photosensitive drum comprising:

a. a cylinder having a photosensitive layer on a peripheral surface thereof;
  b. a twisted projection having a non-circular cross-section with a plurality of corners, said twisted projection being provided at one longitudinal end of said cylinder and being engageable with the twisted recess, wherein said twisted projection is provided with a circular recess provided inside said twisted projection, and wherein said plurality of corners comprise rounded corner portions; and
  c. a permitting portion for permitting engagement between said twisted projection and the twisted recess only at a predetermined relative rotational position therebetween to establish the engagement therebetween with the predetermined relative rotational position, wherein said permitting portion extends from a periphery of said circular recess toward an outer surface of said twisted projection at one of said rounded corner portions of said twisted projection,
  wherein when the process cartridge is mounted to the main assembly of the color electrophotographic image forming apparatus, the driving force is transmitted from the gear to said electrophotographic photosensitive drum by rotation of the gear with the twisted projection being in engagement with the twisted recess.

18. A drum according to claim 17, wherein a bottom surface of said circular recess is provided with an opening, through which a drum shaft for supporting said electrophotographic photosensitive drum on a cartridge frame extends.

19. An electrophotographic image forming apparatus for forming an image on a recording material, comprising:
  a. a motor;
  b. a driving rotatable member for transmitting a driving force from said motor;
  c. a twisted recess provided at a central portion of said driving rotatable member and having a non-circular cross-section with a plurality of corners, said twisted recess being rotatable integrally with said driving rotatable member; and
  d. a mounting portion for mounting a process cartridge, the process cartridge including:
    an electrophotographic photosensitive drum;
    process means actable on the electrophotographic photosensitive drum;
    a twisted projection having a non-circular cross-section with a plurality of corners, the twisted projection being provided at one longitudinal end of the electrophotographic photosensitive drum and being engageable with said twisted recess; and
    a permitting portion for permitting engagement between the twisted projection and said twisted recess only at a predetermined relative rotational position therebetween to establish the engagement therebetween with the predetermined relative rotational position,
    wherein when the process cartridge is mounted to a main assembly of said apparatus, the driving force is transmitted from said driving rotatable member to the electrophotographic photosensitive drum by rotation of said driving rotatable member with the twisted projection being in engagement with said twisted recess.

20. A color electrophotographic image forming apparatus for forming an image on a recording material, comprising:
  a. a motor;
  b. a gear for transmitting a driving force from said motor;
  c. a twisted recess provided at a central portion of said gear and having a non-circular cross-section with a plurality of corners, said twisted recess being rotatable integrally with said gear; and
  d. a mounting portion for mounting a process cartridge, the process cartridge including;
    an electrophotographic photosensitive drum;
    a developing member for developing an electrostatic latent image formed on the photosensitive drum;
    a charging member for charging the electrophotographic photosensitive drum;
    a twisted projection having a non-circular cross-section with a plurality of corners, the twisted projection being provided at one longitudinal end of the electrophotographic photosensitive drum and being engageable with said twisted recess, wherein the twisted projection is provided with a circular recess provided inside the twisted projection, wherein the plurality of corners of the twisted projection comprise rounded corner portions; and
    a permitting portion for permitting engagement between the twisted protection and said twisted recess only at a predetermined relative rotational position therebetween to establish the engagement therebetween with the predetermined relative rotational position, wherein the permitting recess extends from a periphery of the circular recess toward an outer surface of the twisted projection at one of the rounded corner portions of the twisted projection,
    wherein when the process cartridge is mounted to a main assembly of said apparatus, the driving force is transmitted from said gear to the electrophotographic photosensitive drum by rotation of said gear with the twisted projection being in engagement with said twisted recess, wherein said apparatus comprises a plurality of said gears, a plurality of said twisted recesses and a plurality of said mounting portions.

* * * * *

UNITED STATES PATENT AND TRADEMARK OFFICE
CERTIFICATE OF CORRECTION

PATENT NO. : 6,684,041 B2
DATED : January 27, 2004
INVENTOR(S) : Kanji Yojomori et al.

It is certified that error appears in the above-identified patent and that said Letters Patent is hereby corrected as shown below:

Column 1,
Line 14, "a process cartride" should read -- a --.
Line 52, "serviceman," should read -- servicecmen, --.

Column 2,
Line 30, "Y color" should read -- Y --.
Line 31, "a distance" should read -- a --.

Column 3,
Line 15, "time" should read -- time of --.

Column 4,
Line 62, "7b. 7c." should read -- 7b, 7c, --.
Line 66, "protection" should read -- projection --.

Column 5,
Line 18, "add" should read -- at --.
Line 57, "150 $\mu$m" should read -- 150 $\mu$m. --.
Line 58, "(film." should be deleted.

Column 6,
Line 53, "image" should read -- image is --.

Column 7,
Line 4, "is the" should read -- is --.
Line 53, "the 43" should read -- the --.

Column 8,
Line 5, "comprises" should read -- comprise --.
Line 53, "support" should read -- supported --.

Column 9,
Line 15, "indicated by the" should be deleted.

Column 11,
Line 11, "protection," should read -- projection, --.
Lines 35, 43, 46 and 52, "(e.g." should read -- (e.g., --.
Line 53, "protection" should read -- projection --.

UNITED STATES PATENT AND TRADEMARK OFFICE
CERTIFICATE OF CORRECTION

PATENT NO.    : 6,684,041 B2
DATED         : January 27, 2004
INVENTOR(S)   : Kanji Yojomori et al.

It is certified that error appears in the above-identified patent and that said Letters Patent is hereby corrected as shown below:

Column 16,
Line 49, "protection" should read -- projection --.

Signed and Sealed this

Seventh Day of September, 2004

JON W. DUDAS
*Acting Director of the United States Patent and Trademark Office*